United States Patent
Iyanagi

(10) Patent No.: US 10,414,110 B2
(45) Date of Patent: Sep. 17, 2019

(54) PRESSURE DEVICE FOR TIRE CONSTITUENT MEMBER AND TIRE FORMING APPARATUS

(71) Applicant: BRIDGESTONE CORPORATION, Tokyo (JP)

(72) Inventor: Satoshi Iyanagi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 223 days.

(21) Appl. No.: 15/126,616

(22) PCT Filed: Apr. 7, 2015

(86) PCT No.: PCT/JP2015/060850
§ 371 (c)(1),
(2) Date: Sep. 16, 2016

(87) PCT Pub. No.: WO2015/156283
PCT Pub. Date: Oct. 15, 2015

(65) Prior Publication Data
US 2017/0087785 A1    Mar. 30, 2017

(30) Foreign Application Priority Data
Apr. 11, 2014    (JP) ................................. 2014-081833

(51) Int. Cl.
*B29D 30/14*    (2006.01)
*B29D 30/30*    (2006.01)
(Continued)

(52) U.S. Cl.
CPC ............. *B29D 30/14* (2013.01); *B29D 30/16* (2013.01); *B29D 30/26* (2013.01); *B29D 30/28* (2013.01);
(Continued)

(58) Field of Classification Search
CPC ..... B29D 2030/0621–0627; B29D 2030/2635; B29D 2030/3257;
(Continued)

(56) References Cited

U.S. PATENT DOCUMENTS 4,052,246 A    10/1977    Albareda et al.
5,330,609 A    7/1994    Dreyer et al.
(Continued)

FOREIGN PATENT DOCUMENTS

EP    0576923    1/1994
JP    3742111 B2    2/2006

OTHER PUBLICATIONS

Webster's Seventh New Collegiate Dictionary (Definition of "Connected", p. 176). (Year: 1963).*

(Continued)

*Primary Examiner* — Robert C Dye
*Assistant Examiner* — Sedef E Paquette
(74) *Attorney, Agent, or Firm* — Oliff PLC

(57) ABSTRACT

Each of a plurality of pressure rolls is displaced around the shaft member and pressurizes the tire constituent member. Each of a plurality of supporting parts supports the pressure roll rotatably from the inside of the pressure roll and is displaced integrally with the pressure roll. A plurality of pressure holes are formed in a plurality of points of the shaft member corresponding to positions of the plurality of pressure rolls so as to extend in the pressurization direction for the tire constituent member. Each of a plurality of moving members projects in the pressurization direction from the pressure hole so as to pressurize the pressure roll. Each of a plurality of supply pipes is arranged in the inside space around the shaft member so as to each supply the pressurizing medium for pressurizing the moving member into the pressure hole.

16 Claims, 2 Drawing Sheets

(51) Int. Cl.
   *B29D 30/28*   (2006.01)
   *B29D 30/16*   (2006.01)
   *B29D 30/26*   (2006.01)
   *B29C 65/62*   (2006.01)
   *B29C 65/00*   (2006.01)
   *B29D 30/00*   (2006.01)
   *B29D 30/08*   (2006.01)
   *B29D 30/32*   (2006.01)

(52) U.S. Cl.
   CPC .............. *B29D 30/30* (2013.01); *B29C 65/62* (2013.01); *B29C 66/81461* (2013.01); *B29D 30/0061* (2013.01); *B29D 30/08* (2013.01); *B29D 2030/3257* (2013.01)

(58) Field of Classification Search
   CPC .... B29D 30/0061; B29D 30/08; B29D 30/14; B29D 30/26; B29D 30/28; B29D 30/16; B29D 30/30; B29C 66/81461; B29C 65/62
   USPC ..... 156/117, 394.1, 397, 414, 416, 412, 413
   See application file for complete search history.

(56) References Cited

U.S. PATENT DOCUMENTS

| | | | |
|---|---|---|---|
| 6,105,648 A * | 8/2000 | De Graaf | F16O 13/024 156/412 |
| 7,810,539 B2 | 10/2010 | Mischler et al. | |
| 2008/0000576 A1 | 1/2008 | Miller et al. | |

OTHER PUBLICATIONS

Apr. 4, 2017 Search Report issued in European Patent Application No. 15776660.1.

May 26, 2015 International Search Report issued in International Patent Application No. PCT/JP2015/060850.

\* cited by examiner

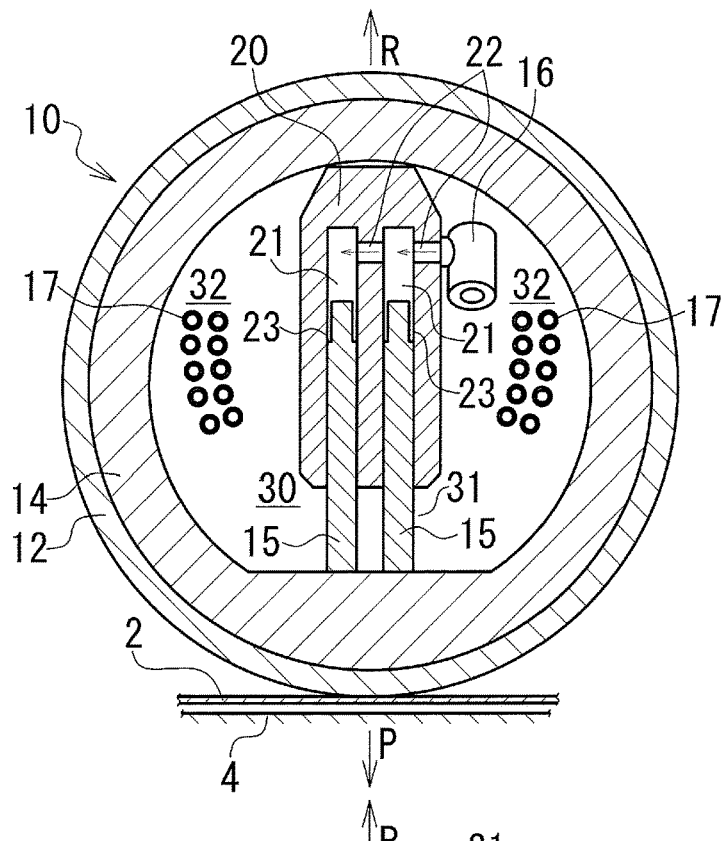
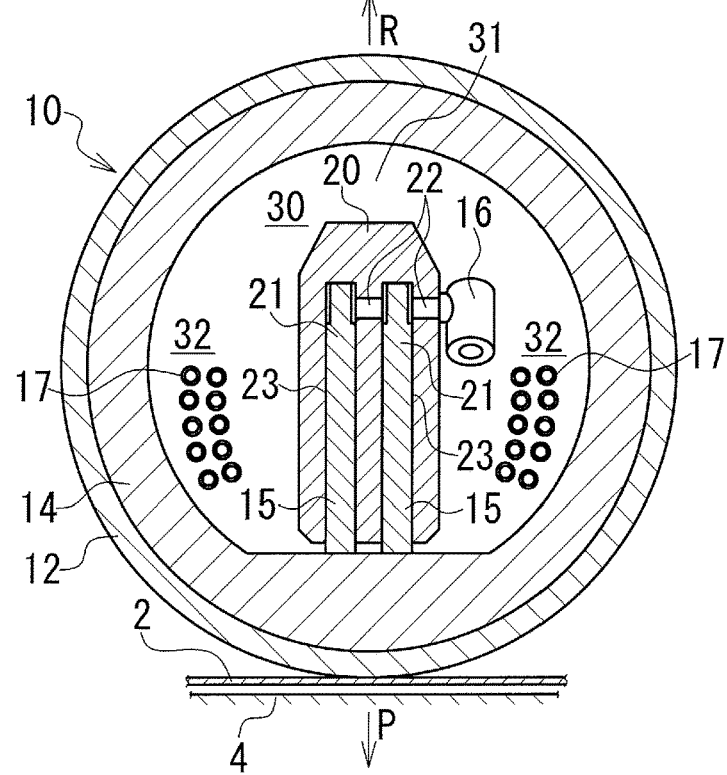

PRESSURE DEVICE FOR TIRE CONSTITUENT MEMBER AND TIRE FORMING APPARATUS

TECHNICAL FIELD

The present invention relates to a pressure device for tire constituent member to pressurize a tire constituent member which is arranged on a forming drum and a tire forming apparatus.

BACKGROUND ART

At the time of the tire forming, various tire constituent members are arranged on the forming drum, and a green tire is formed of a plurality of the tire constituent members. In addition, the tire constituent members are pressurized at the circumference of the forming drum by a pressure device to join the tire constituent members or to push out air therefrom at a scheduled stage of the tire forming. With respect to the pressurization of these tire constituent members, a device for pressurizing a plurality of rolls (pressure rolls) attached to a shaft to pressurize the tire constituent member by the plurality of pressure rolls is conventionally known (See Patent Document 1).

In the conventional device described in the patent document 1, a medium for pressurization (pressurizing medium) is supplied by the passages in the shaft, and the plurality of pressure rolls are pressurized by the pressurizing medium. In addition, the plurality of pressure rolls pressurize the tire constituent member while being displaced in response to the surface shape of the tire constituent member. However, in this conventional device, it is difficult to form the same number of the passages as the plurality of pressure rolls in the independent state with respect to one another because the number of the passages that can be formed in the shaft and the routes of the passages are limited. Therefore, for example, in one control zone where the plurality of pressure rolls are combined, the pressure rolls are pressurized by the pressurizing medium having the same pressure, and the pressure of the pressure rolls is controlled with respect to each control zone.

In this way, in the conventional device, it is difficult to change the pressure of the pressurizing medium with respect to each pressure roll and thus the individual pressure controls of the plurality of pressure rolls cannot be easily performed. For example, there is one demand to change a pressure applied to the tire constituent member depending on each part of the tire constituent member and another demand to change a pressure applied to each part of the tire constituent member to adjust the quantity of joining of the tire constituent member. However, in the conventional device as mentioned above, such demands cannot be easily coped with. In addition, if the pressures of the plurality of pressure rolls are individually controlled by this conventional device, the formation of the passages to the shaft becomes difficult and the structure of the device including the shaft is complicated in response to the increase in number of the passages and roots.

PRIOR-ART DOCUMENTS

Patent Document

[Patent Document 1] Japanese Patent Publication No. 3742111

SUMMARY OF INVENTION

Problems to be Solved by the Invention

The present invention is made in view of the above-described prior-art problems and has an object to easily perform the individual pressure control of the plurality of pressure rolls while restraining the structure of the pressure device pressurizing the tire constituent member by the plurality of pressure rolls from becoming complicated.

Means for Solving the Problems

The present invention is a pressure device for tire constituent member to pressurize a tire constituent member which is arranged on a forming drum, the device comprising: a shaft member; a plurality of pressure rolls each of which is displaced around the shaft member and pressurizes the tire constituent member; an inside space formed around the shaft member inside of the plurality of pressure rolls; a plurality of supporting parts each of which supports the pressure roll rotatably from the inside of the pressure roll and is displaced integrally with the pressure roll; a plurality of pressure holes formed in a plurality of points of the shaft member corresponding to positions of the plurality of pressure rolls so as to extend in the pressurization direction for the tire constituent member from the inside of the shaft member; a plurality of moving members each of which moves in the pressure hole and projects in the pressurization direction for the tire constituent member from the pressure hole so as to pressurize the supporting part fixed to a tip end thereof and the pressure roll, and a plurality of supply pipes arranged in the inside space around the shaft member so as to each supply the pressurizing medium for pressurizing the moving member into the pressure hole.

In addition, the present invention is a tire forming apparatus comprising: a forming drum on which the tire constituent member is arranged; and the pressure device for tire constituent member.

Advantages of the Invention

According to the present invention, the individual pressure control of the plurality of pressure rolls is easily performed while restraining the structure of the pressure device pressurizing the tire constituent member by the plurality of pressure rolls from becoming complicated.

BRIEF DESCRIPTION OF THE DRAWINGS

FIG. 3A is a cross-sectional view of the pressure device for tire constituent member taken along the line Y-Y in FIG. 2.

FIG. 3B is a cross-sectional view of the pressure device for tire constituent member taken along the line Y-Y in FIG. 2.

DESCRIPTION OF EMBODIMENTS

An embodiment of a pressure device for tire constituent member and a tire forming apparatus of the present invention will be described below by referring to the attached drawings.

The pressure device for tire constituent member of the present embodiment is established in the tire forming apparatus forming a tire (green tire) and pressurizes a tire constituent member arranged on the forming drum. The tire constituent member is a member constituting each part of a tire and is made of one member or a plurality of members combined. At the circumference of the forming drum, the pressure device for tire constituent member pressurizes various tire constituent members (inner liner, carcass ply, belt, tread rubber etc.).

Figure 1:
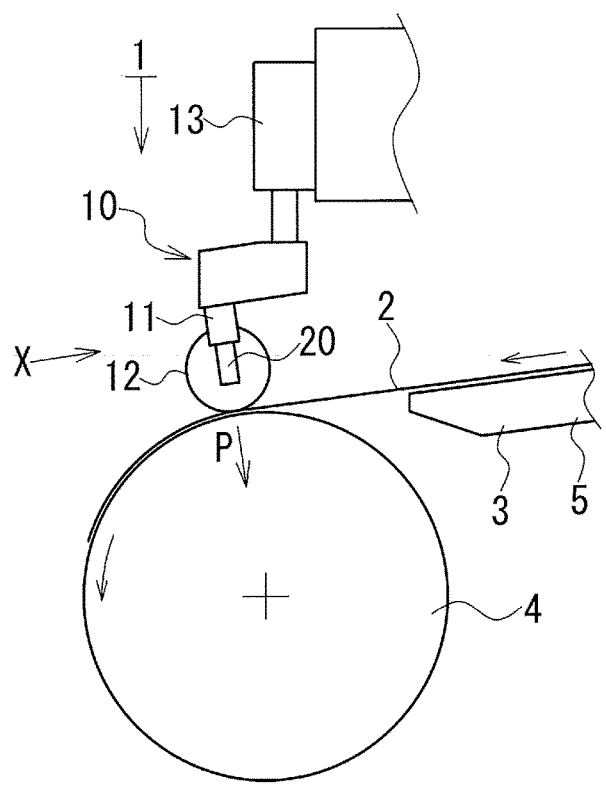
FIG. 1 is a side view illustrating a skeleton framework of a tire forming apparatus of the present embodiment.

FIG. 1 is a side view illustrating a skeleton framework of a tire forming apparatus 1 of the present embodiment.

The tire forming apparatus 1 comprises, as illustrated in the figure, a supply device 3 to supply a tire constituent member 2, a forming drum 4 on which the tire constituent member 2 is arranged, a pressure device 10 for the tire constituent member 2 and a control unit (not shown). The tire forming apparatus 1 is controlled by the control unit and carries out the tire forming operation and, by the pressure device 10, pressurizes the tire constituent member 2 from the outer peripheral side thereof.

The supply device 3 has a carrier device 5 conveying the tire constituent member 2 and supplies the tire constituent member 2 to the forming drum 4 in tune with a rotation of the forming drum 4. The forming drum 4 is a cylindrical drum forming the tire constituent member 2 and rotates around an axis at predetermined speed by a rotation device (not shown) having a motor etc. The tire constituent member 2 is wound around the circumference of the forming drum 4 and is arranged at the predetermined position on the circumference of the forming drum 4 and is formed into a cylinder form by the forming drum 4. During placement of the tire constituent member 2 to the forming drum 4 or after the placement of the tire constituent member 2 to the forming drum 4, the pressure device 10 pressurizes the tire constituent member 2 towards the forming drum 4.

Figure 2:
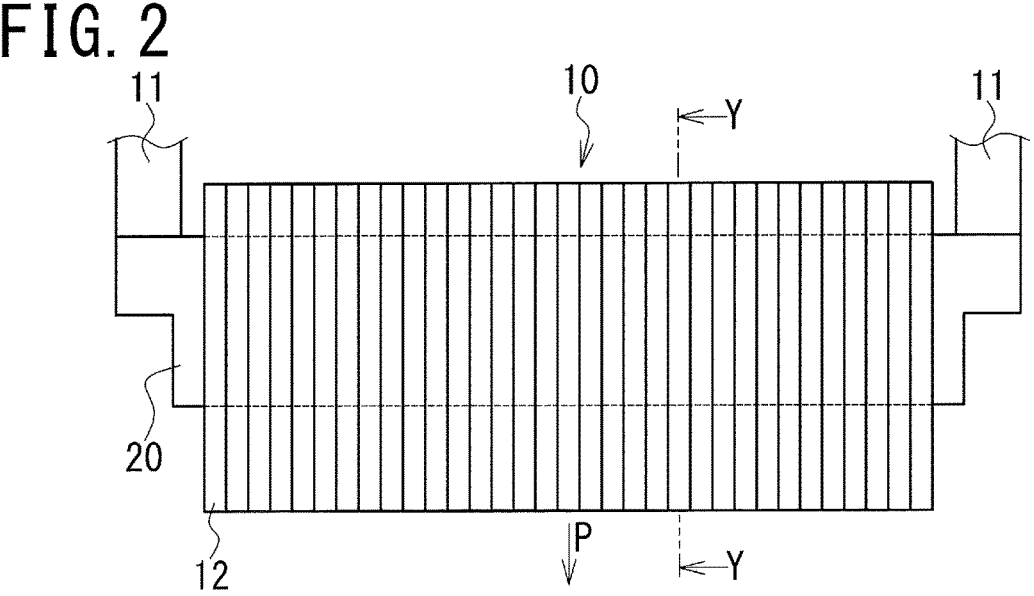
FIG. 2 is a front view illustrating a pressure device for tire constituent member of the present embodiment.

FIG. 2 is a front view illustrating a pressure device 10 for the tire constituent member 2 of the present embodiment and shows a part of the pressure device 10 which watched from the X direction in FIG. 1. As shown in FIGS. 1 and 2, the pressure device 10 comprises a shaft member 20 linearly extending, a pair of holding member 11 holding both ends of the shaft member 20, a plurality of pressure rolls 12 rotatably surrounding the shaft member 20 and a moving device 13 moving the shaft member 20. The shaft member 20 is a non-rotation core member arranged inside of the plurality of pressure rolls 12 and penetrates the plurality of pressure rolls 12 in the direction of axis thereof. The plurality of pressure rolls 12 are arranged in the direction of axis of the shaft member 20 and are sequentially adjacent around the shaft member 20. The pair of holding members 11 connect the shaft 20 with the moving device 13.

The moving device 13 is such as a piston cylinder mechanism and moves the shaft member 20 together with the plurality of pressure rolls 12 in the radial direction of the forming drum 4. By the moving device 13, the shaft member 20 is brought close to the forming drum 4 or is separated from the forming drum 4. In addition, by the moving device 13, the plurality of pressure rolls 12 are moved to a position at which they are in contact with the tire constituent member 2 or a position at which they are apart from the tire constituent member 2. The plurality of pressure rolls 12 are annular pressurizing members rotating in contact with the tire constituent member 2 and pressurizes the tire constituent member 2 in the predetermined pressurization direction P.

At the time of the pressurization of the tire constituent member 2, the shaft member 20 is located along the tire constituent member 2 at the pressurization position, and the plurality of pressure rolls 12 stands in a row along the outer peripheral surface of the tire constituent member 2. Here, the shaft member 20 is located parallel to the direction of axis of the forming drum 4. At the predetermined position in the circumferential direction of the forming drum 4, the plurality of pressure rolls 12 pressurize the whole portion in the width direction of the tire constituent member 2. With the rotation of the forming drum 4, the plurality of pressure rolls 12 relatively move in the circumferential direction of the forming drum 4 and pressurizes the whole portion in the circumferential direction of the tire constituent member 2. On this occasion, in the pressure device 10, each of the plurality of pressure rolls 12 is pressurized by a mechanism for pressurization (pressurization mechanism) (not shown) established inside of the plurality of pressure rolls 12 in the pressurization direction P for the tire constituent member 2. In addition, the pressurization direction P for the tire constituent member 2 is a direction of the pressure applied to the tire constituent member 2 from the pressure rolls 12, and the width direction of the tire constituent member 2 is a direction that is parallel to the direction of axis of the forming drum 4.

FIG. 3 is a cross-sectional view of the pressure device 10 for the tire constituent member 2 taken along the line Y-Y in FIG. 2 and shows a cross section of the pressure device 10 taken along the plane orthogonal to the direction of axis of the shaft member 20. In addition, FIG. 3 shows one pressure roll 12 pressurizing the tire constituent member 2. The pressure roll 12 is displaced between a position shown in FIG. 3A and a position shown in FIG. 3B. Each of the plurality of pressure rolls 12 independently operates like the pressure roll 12 shown in FIG. 3.

As shown in Figs., the plurality of pressure rolls 12 are displaced each in the predetermined direction around the shaft member 20 by the pressure device 10 in a state where the plurality of pressure rolls 12 surround the shaft member 20. Here, the plurality of pressure rolls 12 are displaced independently one another in the pressurization direction P for tire constituent member 2 or in the direction opposite to the pressurization direction P (it is said as the opposite direction R as follows). In addition, the plurality of pressure rolls 12 are each pushed to the tire constituent member 2 so as to pressurize the tire constituent member 2 in the pressurization direction P.

The pressure device 10 comprises an inside space 30 formed inside of the plurality of pressure rolls 12, a plurality of annular supporting parts 14 located in the insides of the plurality of pressure rolls 12, respectively, a plurality of pressure holes 21 formed in the shaft member 20, a plurality of moving member 15 inserted in the plurality of pressure holes 21, respectively, a plurality of supply channels 22 connected to the plurality of pressure holes 21, a plurality of connections 16 attached to the plurality of supply channels 22 and a plurality of supply pipes 17 connected to the plurality of connections 16. The inside space 30 is formed around the shaft member 20 inside of the plurality of pressure rolls 12 and continues along the direction of axis of the shaft member 20.

Each of the plurality of supporting parts 14 is coupled to the inner circumference of the pressure roll 12 and supports the pressure roll 12 rotatably from the inside of the pressure roll 12. In the state, each of the plurality of supporting parts 14 is displaced integrally with the pressure roll 12, and each of the plurality of pressure rolls 12 rotates in the circumferential direction of the supporting part 14. Here, a bearing is used for pressurization of the tire constituent member 2.

In other words, the pressure roll 12 is an outer circumference member of the bearing and the supporting part 14 is an inner circumference member of the bearing. A plurality of balls (not shown) are inserted between the pressure roll 12 and the supporting part 14. In addition, the supporting part 14 is located between the pressure roll 12 and the shaft member 20 and surrounds the shaft member 20. The shaft member 20 is located inside of the plurality of supporting parts 14 and forms the inside space 30 between the shaft member 20 and the plurality of supporting parts 14.

In this way, the inside space 30 is a space formed between the shaft member 20 and the supporting parts 14 and formed in the whole around the shaft member 20 in a state where the shaft member 20 has no contact with the supporting parts 14. In addition, the inside space 30 around the shaft member 20 is composed of a space for displacement 31 in which the plurality of pressure rolls 12 are displaced and a space for pipe arrangement 32 in which the plurality of supply pipes 17 are arranged. A pair of the spaces for pipe arrangement 32 are formed in both sides of the shaft member 20 located in the space for displacement 31, respectively, and the shaft member 20 and the space for displacement 31 are located between the pair of spaces for pipe arrangement 32.

The space for displacement 31 is a part of the inside space 30 and is a space in which the plurality of pressure rolls 12 are displaced in the pressurization direction P for the tire constituent member 2 and in the opposite direction R. By displacement of each of the pressure rolls 12, the position of the shaft member 20 relatively changes in the space for displacement 31 inside of each of the pressure rolls 12. With this, the pressure rolls 12 together with the supporting parts 14 are displaced relative to the shaft member 20 in the pressurization direction P and in the opposite direction R. The space for pipe arrangement 32 is a part of the inside space 30 except the space for displacement 31, and is used to arrange the plurality of supply pipes 17.

The plurality of pressure holes 21 are formed in the plurality of points of the shaft member 20 corresponding to the positions of the plurality of pressure rolls 12 so as to extend in the pressurization direction P for the tire constituent member 2 from the inside of the shaft member 20. Specifically, at least one of the pressure holes 21 is formed into a linear shape in the shaft member 20 inside of each of the pressure rolls 12 in the radial direction thereof. One end of the pressure hole 21 is open at the end of the shaft member 20 at the side of the forming drum 4 (the tire constituent member 2) and the other end of the pressure hole 21 is positioned in the shaft member 20. Here, two pressure holes 21 are formed in the shaft member 20 parallel to each other inside of each of the pressure rolls 12 in the radial direction thereof, and the ends of two pressure holes 21 located in the shaft member 20 are connected by the supply channels 22.

The moving member 15 is a movable member in a form of rod (piston) which can move in the pressure hole 21 and moves in the centerline direction of the pressure hole 21 (the pressurization direction P for the tire constituent member 2 and the opposite direction R). The cross-sectional shape orthogonal to the centerline direction of the pressure hole 21 is a form of circle, and the moving member 15 consists of a columnar member. In addition, the moving member 15 has a seal member (not shown) attached to a part thereof in the pressure hole 21 so that the pressure hole 21 is sealed up by the seal member. The tip end of the moving member 15 located outside of the pressure hole 21 is fixed to the supporting part 14, and thereby the supporting part 14 and the pressure roll 12 are displaced around the shaft member 20 by movement of the moving member 15. Each of the plurality of moving members 15 moves in the pressure hole 21 and projects from the pressure hole 21 in the pressurization direction P for the tire constituent member 2 and thereby pressurizes the supporting part 14 fixed to the tip end thereof and the pressure roll 12 in the pressurization direction P for the tire constituent member 2.

The shaft member 20 has a guide part 23 formed in the inner periphery of the pressure hole 21 and the moving member 15 moving in the pressure hole 21 is guided by the guide part 23. Here, the guide part 23 is the inner peripheral surface of the pressure hole 21, and is in contact with the outer peripheral surface of the moving member 15. In the pressure hole 21, the moving member 15 is guided by the guide part 23 by sliding on the guide part 23 and thereby moves in the centerline direction of the pressure hole 21. Each of the plurality of supporting parts 14 is connected to the shaft member 20 only by the moving members 15 and is held only by the shaft member 20. At the time of a rotation of the pressure roll 12, the supporting part 14 is held not to rotate by the moving members 15. In addition, at the time of a displacement of the pressure roll 12, the supporting part 14 is displaced around the shaft member 20 integrally with the pressure roll 12 without contact with the shaft member 20.

Each of the plurality of supply channels 22 is formed in the shaft member 20 and supplies the pressurizing medium for pressurizing the moving member 15 in the pressure hole 21. For example, the pressurizing medium is a fluid adjusted to have a predetermined pressure and is supplied to the end of the pressure hole 21 in the shaft member 20 from the outside of the shaft member 20 through the supply channel 22. The moving member 15 is pressurized at the predetermined pressure in the pressurization direction P for the tire constituent member 2 by the pressurizing medium supplied into the pressure hole 21. The supporting part 14 and the pressure roll 12 are pressurized by the moving member 15 and thereby the pressure roll 12 pressurizes the tire constituent member 2 by the predetermined pressure. At the time of the pressurization of the tire constituent member 2, all the moving members 15 fixed to one supporting part 14 are pressurized by the same pressure. For that reason, each of the supply channels 22 supplies the pressurizing medium of the same pressure into the two pressure holes 21 corresponding to each of the pressure rolls 12.

The connection 16 is a joint for pipe arrangement, and each of the plurality of connections 16 is attached to the end of the supply channel 22 at the outside of the shaft member 20. Each of the plurality of supply pipes 17 is connected to a feeding device (not shown) for feeding the pressurizing medium and the connection 16 and is connected to the supply channel 22 by the connection 16. The feeding device for feeding the pressurizing medium is connected to the ends of the plurality of supply pipes 17 outside of the inside space 30. The supply pipe 17 extends along the direction of axis of the shaft member 20 in the inside space 30 and is connected to the supply channel 22 as object of connection. The pressurizing medium for pressurizing the tire constituent member 2 is supplied from the feeding device into the pressure hole 21 through the supply pipe 17 and the supply channel 22.

Each of the plurality of supply pipes 17 supplies the pressurizing medium for pressurizing the moving member 15 into the supply channel 22 and the pressure hole 21. On this occasion, the pressure of the pressurizing medium is adjusted to the predetermined pressure by the feeding device with respect to each pressurizing medium to be supplied to each of the plurality of supply pipes 17. Each of the plurality of supply pipes 17 supplies the pressurizing medium which pressure is independently adjusted into the pressure hole 21. In addition, the plurality of supply pipes 17 are arranged in the inside space 30 (the spaces for pipe arrangement 32) around the shaft member 20 and are placed in the inside space 30 between the shaft member 20 and the supporting part 14. Here, the plurality of supply pipes 17 are divided into two groups and are arranged in the spaces for pipe arrangement 32 at the one side and the other side of the shaft member 20 and are arranged at the positions that the plurality of supply pipes 17 have no contact with the shaft member 20 which is relatively displaced in the space for displacement 31.

When forming a tire by the tire forming apparatus 1 (see FIG. 1), at first, the tire constituent member 2 is supplied to the forming drum 4 by the supply device 3 and winded around the outer periphery of the forming drum 4. On this occasion, the shaft member 20 is moved by the moving device 13 so that the plurality of pressure rolls 12 are brought into contact with the tire constituent member 2. In addition, the pressurizing medium is supplied from the plurality of supply pipes 17 (see FIG. 3) into the plurality of pressure holes 21 and each of the plurality of pressure rolls 12 is pressurized by the moving members 15. By the pressurizing medium in the pressure hole 21, the moving member 15 is projected from the pressure hole 21 in the pressurization direction P for the tire constituent member 2 and pushes the pressure roll 12 to the tire constituent member 2. With this, the plurality of pressure rolls 12 pressurize the tire constituent member 2. When the pressure roll 12 is pushed by a convex portion that occurred on the surface of the tire constituent member 2, the pressure roll 12 is displaced in the opposite direction R while pressurizing the tire constituent member 2.

In a state where the moving member 15 is most projecting from the pressure hole 21 (see FIG. 3A), the shaft member 20 is in contact with the supporting part 14 at the side in the opposite direction R. In the state, when the pressure roll 12 is displaced in the opposite direction R, the moving member 15 gradually moves in the pressure hole 21. When moving member 15 is less able to move in the pressure hole 21 (see FIG. 3B), the displacement of the pressure roll 12 in the opposite direction R stops. The pressure device 10 pressurizes the tire constituent member 2 arranged on the forming drum 4 by the plurality of pressure rolls 12 in a state where the plurality of pressure rolls 12 can be displaced. In addition, the pressure device 10 adjusts the pressure of the pressurizing medium supplied to the pressure hole 21 through the plurality of supply pipes 17 individually and adjusts the pressure to be applied to the moving member 15 and the pressure roll 12. In this way, the pressure device 10 controls the pressure applied to the plurality of pressure rolls 12 individually and pressurizes all parts of tire constituent member 2 by the predetermined pressure by the pressure rolls 12, respectively.

For joining the ends of the tire constituent member 2, the tire constituent member 2 is pressurized by the plurality of pressure rolls 12 while the forming drum 4 is rotating. On this occasion, the pressure of each of the pressure rolls 12 is adjusted according to a shape, quantity of shrinkage or quantity of stretch of the tire constituent member 2 and thereby the volume of deformation of the tire constituent member 2 with each of the pressure rolls 12 is adjusted. The ends of the tire constituent member 2 are formed in a desired shape and in this way the quantity of joining of the tire constituent member 2 is adjusted. In addition, the pressure of the plurality of pressure rolls 12 at a joint portion of the tire constituent member 2 is raised and thereby the tire constituent member 2 is surely joined by high pressure. For making the plurality of tire constituent members 2 arranged on the forming drum 4 adhere to each other, air between the plurality of tire constituent members 2 is pushed out by pressurization of the plurality of pressure rolls 12 so that the plurality of tire constituent members 2 surely adhere to each other.

In the pressure device 10 for the tire constituent member 2 as explained above, the plurality of supply pipes 17 are arranged in the inside space 30 around the shaft member 20. Therefore, the number of the supply pipes 17 corresponding to the number of the pressure rolls 12 can be easily arranged inside of the plurality of pressure rolls 12 without complicating the structure of the pressure device 10. In addition, the pressure of the plurality of pressure rolls 12 can be exactly changed by changing the pressure of the pressurizing medium to be supplied to the plurality of supply pipes 17. In this way, the individual pressure control of the plurality of pressure rolls 12 can be easily performed while restraining the structure of the pressure device 10 from being complicated.

Because the moving member 15 is guided by the guide part 23 formed in the inner periphery of the pressure hole 21 at the time of the movement of the moving member 15, the pressure roll 12 is exactly guided only by the guide part 23 in the pressure hole 21 and the moving member 15. In addition, since the supporting part 14 is held by the moving member 15, the supporting part 14 can be surely held with a simple structure. Because the inside space 30 is composed of the space for displacement 31 and the space for pipe arrangement 32, the shaft member 20 can be prevented from coming in contact with the plurality of supply pipes 17 when a position of the shaft member 20 in the space for displacement 31 changes.

In addition, according to the number of the supply pipes 17, the plurality of supply pipes 17 may be arranged in the spaces for pipe arrangement 32 at both sides of the shaft member 20 or may be arranged in the space for pipe arrangement 32 at one side of the shaft member 20. In a case where the plurality of supply pipes 17 are arranged in the spaces for pipe arrangement 32 at both sides (the one side, the other side) of the shaft member 20, for example, the supply pipe 17 at the one side and the supply pipe 17 at the other side are alternately connected to the supply channel 22 along the direction of axis of the shaft member 20. In addition, the supporting part 14 may be one member or may be composed of a plurality of members combined. For example, the supporting part 14 may be composed of an annular inner circumference member fixed to the moving member 15 and an annular outer circumference member supporting the pressure roll 12.

DESCRIPTION OF THE REFERENCE SYMBOLS 1 tire forming apparatus
2 tire constituent member
3 supply device
4 forming drum
5 carrier device
10 pressure device for tire constituent member
11 holding member
12 pressure roll
13 moving device
14 supporting part
15 moving member
16 connection 17 supply pipe
20 shaft member
21 pressure hole
22 supply channel
23 guide part
30 inside space
31 space for displacement
32 space for pipe arrangement

The invention claimed is:

1. A pressure device for a tire constituent member in order to pressurize the tire constituent member which is arranged on a forming drum, the device comprising:
a shaft member;
a plurality of pressure rolls each of which is displaced around the shaft member and pressurizes the tire constituent member;
an inside space formed around the shaft member inside of the plurality of pressure rolls;
a plurality of supporting parts each of which supports a respective pressure roll of the plurality of pressure rolls rotatably from inside of the respective pressure roll and is displaced integrally with the respective pressure roll;
a plurality of pressure holes formed in a plurality of points of the shaft member corresponding to positions of the plurality of pressure rolls so as to extend in a pressurization direction for the tire constituent member from inside of the shaft member;
a plurality of moving members each of which moves in a respective pressure hole of the plurality of pressure holes and projects in the pressurization direction for the tire constituent member from the respective pressure hole so as to pressurize a respective supporting part of the plurality of supporting parts fixed to a tip end thereof and the respective pressure roll, and
a plurality of supply pipes arranged in the inside space around the shaft member so as to each supply a pressurizing medium for pressurizing a respective moving member of the plurality of moving members into the respective pressure hole.

2. The pressure device for the tire constituent member according to claim 1, wherein
the shaft member has a guide part formed in an inner periphery of the respective pressure hole and guiding the respective moving member moving in the respective pressure hole.

3. The pressure device for the tire constituent member according to claim 1, wherein
each of the plurality of supporting parts is connected to the shaft member only by the respective moving member and is held by the respective moving member.

4. The pressure device for the tire constituent member according to claim 1, wherein
the inside space around the shaft member is composed of a space for displacement in which the plurality of pressure rolls are displaced and a space for pipe arrangement in which the plurality of supply pipes are arranged.

5. The pressure device for the tire constituent member according to claim 2, wherein
each of the plurality of supporting parts is connected to the shaft member only by the respective moving member and is held by the respective moving member.

6. The pressure device for the tire constituent member according to claim 2, wherein
the inside space around the shaft member is composed of a space for displacement in which the plurality of pressure rolls are displaced and a space for pipe arrangement in which the plurality of supply pipes are arranged.

7. The pressure device for the tire constituent member according to claim 3, wherein
the inside space around the shaft member is composed of a space for displacement in which the plurality of pressure rolls are displaced and a space for pipe arrangement in which the plurality of supply pipes are arranged.

8. The pressure device for the tire constituent member according to claim 5, wherein
the inside space around the shaft member is composed of a space for displacement in which the plurality of pressure rolls are displaced and a space for pipe arrangement in which the plurality of supply pipes are arranged.

9. A tire forming apparatus comprising:
a forming drum on which the tire constituent member is arranged; and
the pressure device for the tire constituent member according to claim 1.

10. A tire forming apparatus comprising:
a forming drum on which the tire constituent member is arranged; and
the pressure device for the tire constituent member according to claim 2.

11. A tire forming apparatus comprising:
a forming drum on which the tire constituent member is arranged; and
the pressure device for the tire constituent member according to claim 3.

12. A tire forming apparatus comprising:
a forming drum on which the tire constituent member is arranged; and
the pressure device for the tire constituent member according to claim 5.

13. A tire forming apparatus comprising:
a forming drum on which the tire constituent member is arranged; and
the pressure device for the tire constituent member according to claim 4.

14. A tire forming apparatus comprising:
a forming drum on which the tire constituent member is arranged; and
the pressure device for the tire constituent member according to claim 6.

15. A tire forming apparatus comprising:
a forming drum on which the tire constituent member is arranged; and
the pressure device for the tire constituent member according to claim 7.

16. A tire forming apparatus comprising:
a forming drum on which the tire constituent member is arranged; and
the pressure device for the tire constituent member according to claim 8.

* * * * *